US007905088B2

(12) United States Patent
Stephenson et al.

(10) Patent No.: US 7,905,088 B2

(45) Date of Patent: Mar. 15, 2011

(54) ENERGY RECOVERY AND REUSE TECHNIQUES FOR A HYDRAULIC SYSTEM

(75) Inventors: Dwight B. Stephenson, Oconomowoc, WI (US); Eric P. Hamkins, Waukesha, WI (US); Joseph L. Pfaff, Wauwatosa, WI (US); Keith A. Tabor, Richfield, WI (US)

(73) Assignee: INCOVA Technologies, Inc., Waukesha, WI (US)

( * ) Notice: Subject to any disclaimer, the term of this patent is extended or adjusted under 35 U.S.C. 154(b) by 557 days.

(21) Appl. No.: 11/939,861

(22) Filed: Nov. 14, 2007

(65) Prior Publication Data

US 2008/0110166 A1 May 15, 2008

Related U.S. Application Data

(60) Provisional application No. 60/865,710, filed on Nov. 14, 2006, provisional application No. 60/913,457, filed on Apr. 23, 2007.

(51) Int. Cl.
*F16D 31/02* (2006.01)

(52) U.S. Cl. ................................ 60/414; 60/417; 60/418

(58) Field of Classification Search .................... 60/414, 60/417, 418

See application file for complete search history.

(56) References Cited

U.S. PATENT DOCUMENTS

| | | | | |
|---|---|---|---|---|
| 4,977,928 | A | 12/1990 | Smith et al. | |
| 4,995,517 | A * | 2/1991 | Saotome | 91/437 |
| 5,678,470 | A | 10/1997 | Koehler et al. | |
| 5,878,569 | A | 3/1999 | Satzler | |
| 5,960,695 | A | 10/1999 | Aardema et al. | |
| 6,151,894 | A | 11/2000 | Endo et al. | |
| 6,502,393 | B1 | 1/2003 | Stephenson et al. | |
| 6,748,738 | B2 * | 6/2004 | Smith | 60/414 |
| 6,789,387 | B2 * | 9/2004 | Brinkman | 60/414 |
| 2006/0075749 | A1 | 4/2006 | Cherney et al. | |

FOREIGN PATENT DOCUMENTS

| | | |
|---|---|---|
| JP | 2001027201 | 1/2001 |
| JP | 2001027203 | 1/2001 |

* cited by examiner

*Primary Examiner* — F. Daniel Lopez

(74) *Attorney, Agent, or Firm* — Quarles & Brady LLP; George E. Haas

(57) ABSTRACT

A hydraulic system has a valve assembly with two workports coupled to chambers of first and second cylinders which are connected mechanically in parallel to a machine component. A separation control valve is connected between first chambers of both cylinders, and a shunt control valve is connected between the workports. A recovery control valve couples an accumulator to the first chamber of the second cylinder. Opening and closing the valves in different combinations routes fluid from one or both cylinders into the accumulator where the fluid is stored under pressure, and thereafter enables stored fluid to be used to power one or both cylinders. The shunt control valve is used to route fluid exhausting from one chamber of each cylinder to the other chambers of those cylinders. Thus the hydraulic system recovers and reuses energy in various manners.

32 Claims, 7 Drawing Sheets

ENERGY RECOVERY AND REUSE TECHNIQUES FOR A HYDRAULIC SYSTEM

CROSS-REFERENCE TO RELATED APPLICATIONS

This application claims benefit of U.S. Provisional Patent Application No. 60/865,710 filed on Nov. 14, 2006 and U.S. Provisional Patent Application No. 60/913,457 filed on Apr. 23, 2007.

STATEMENT REGARDING FEDERALLY SPONSORED RESEARCH OR DEVELOPMENT

Not Applicable

BACKGROUND OF THE INVENTION

1. Field of the Invention

The present invention relates to hydraulic systems that control fluid flow to a hydraulic actuator which moves a mechanical component on a machine, and in particular to recovering energy from the hydraulic actuator and utilizing the recovered energy subsequently to power the hydraulic actuator.

2. Description of the Related Art

Construction and agricultural equipment employ hydraulic systems to operate different mechanical elements. For example, an excavator is a common construction machine that has boom pivotally coupled at one end to a tractor and having a bucket at the other end for scooping dirt and other material. A cylinder assembly is used to raise and lower the boom and includes a cylinder with a piston therein which defines two chambers in the cylinder. A rod connected to the piston is typically attached to the boom and the cylinder is attached to the body of the excavator. The boom is raised and lowered by extending and retracting the rod out of and into the cylinder.

Other machines use different types of hydraulic actuators to produce motion of a mechanical element. The term "hydraulic actuator", as used herein, generically refers to any device, such as a cylinder-piston arrangement or a rotational motor for example, that converts hydraulic fluid flow into mechanical motion.

During powered extension and retraction of the cylinder assembly, pressurized fluid from a pump is usually applied by a valve assembly to one cylinder chamber and all the fluid exhausting from the other cylinder chamber flows through the valve assembly into a return conduit that leads to the system tank. Under some conditions, an external load or other force acting on the machine enables extension or retraction of the cylinder assembly without significant fluid pressure from the pump. This is often referred to as an overrunning load. In an excavator for example, when the bucket is filled with heavy material, the boom can be lowered by the force of gravity alone. That external force drives fluid out of one chamber of the boom's hydraulic cylinder through the valve assembly and into the tank. At the same time, an amount of fluid is drawn from the pump through the valve assembly into the other cylinder chamber which is expanding, however because that incoming fluid is not driving the piston, it does not have to be maintained at a significant pressure for this boom motion to occur. In this situation, the fluid is exhausted from the cylinder under relatively high pressure, thereby containing energy that normally is lost when the pressure is metered through the valve assembly.

To optimize efficiency and economical operation of the machine, it is desirable to recover the energy of that exhausting fluid, instead of dissipating it in the valve assembly. Some prior hydraulic systems sent that exhausting fluid to an accumulator, where it was stored under pressure for later use in powering the machine. However, a challenge to efficient energy recovery and reuse is that the stored hydraulic fluid has to be at the proper pressure and volume to power an actuator. The relationship between the pressure and volume of the exhausting fluid and those parameters of the accumulator varies instantaneously and determines whether that fluid can be stored. For example, if the external force acting on the cylinder assembly is insufficient to pressurized the exhausting fluid above the level of pressure in the accumulator, then that fluid cannot be stored.

At another time when use of the fluid in the accumulator is desired, the instantaneous relationship between the pressure and volume of the accumulator and that required of the fluid to power the hydraulic actuator determines whether the accumulator fluid can be used. For example, if the load on the hydraulic actuator requires a greater pressure than the accumulator pressure, then the recovered fluid cannot be employed. Also if the hydraulic actuator needs to move so far as to require a greater volume of fluid than is stored in the accumulator, effective operation may be difficult to achieve. Another limiting factor is that as the hydraulic actuator consumes fluid from the accumulator, the accumulator pressure decreases reducing the ability of the remaining fluid to power the actuator.

Therefore, a need exists to provide an effective techniques for recovering and reusing energy in a hydraulic system.

SUMMARY OF THE INVENTION

A hydraulic system has first and second hydraulic cylinders that are mechanically connected in parallel to operate a component of a machine and each cylinder has first and second chambers. A control valve assembly, such as a Wheatstone bridge arrangement of four electrohydraulic proportional valves for example, has a first workport and a second workport. The first workport is connected to the first chamber of the first cylinder and is isolated from the first chamber of the second cylinder. The second workport is connected to the second chambers of both the first and second hydraulic cylinders. The control valve assembly is operated to connect each of first and second workports selectively to the supply conduit and the return conduit.

An energy recovery apparatus of the hydraulic system comprises a cylinder separation control valve controlling fluid flow between the first chamber of the first cylinder and the first chamber of the second cylinder. An accumulator is connected to a recovery control valve that controls fluid flow to and from the first chamber of the second cylinder. This enables fluid that is forced out of that first chamber by an external load to be routed into the accumulator where it is stored under pressure. Subsequently, the stored fluid is used to power one or both of the hydraulic cylinders.

In another aspect, the present invention provides a first pump connected to the supply conduit. A supply valve controls fluid flow from a second pump to the first chamber of the second cylinder. By closing the supply valve and opening the cylinder separation control valve, both the first and second hydraulic cylinders are controlled in unison by the control valve assembly. Alternatively, closing the cylinder separation control valve, the first hydraulic cylinder is controlled by the control valve assembly, while the second hydraulic cylinder is controlled by opening the supply valve.

In a preferred embodiment of the hydraulic system, a workport shunt control valve is connected to first and second workports to enable fluid to flow directly there between.

In another aspect of the invention, an energy recovery apparatus is provided including a hydraulic cylinder to operate a component of a machine. The energy recovery apparatus includes a first chamber and a second chamber. A control valve assembly including a first workport and a second workport is connected to the first and second chamber, such that the first workport is in fluid communication with the first chamber of the hydraulic cylinder and the second workport is in fluid communication with the second chamber of the hydraulic cylinder, and such that operation of the control valve assembly connects each of first and second workports selectively to the supply conduit and the return conduit. A workport shunt control valve is in fluid communication with both the first workport and the second workport to control fluid flow there between. The system includes an accumulator and a recovery control valve that controls fluid flow to the accumulator from the first chamber of the cylinder.

DETAILED DESCRIPTION OF THE INVENTION

Although the present invention is being described in the context of use on an excavator, it can be implemented on other types of hydraulically operated equipment.

Figure 1:
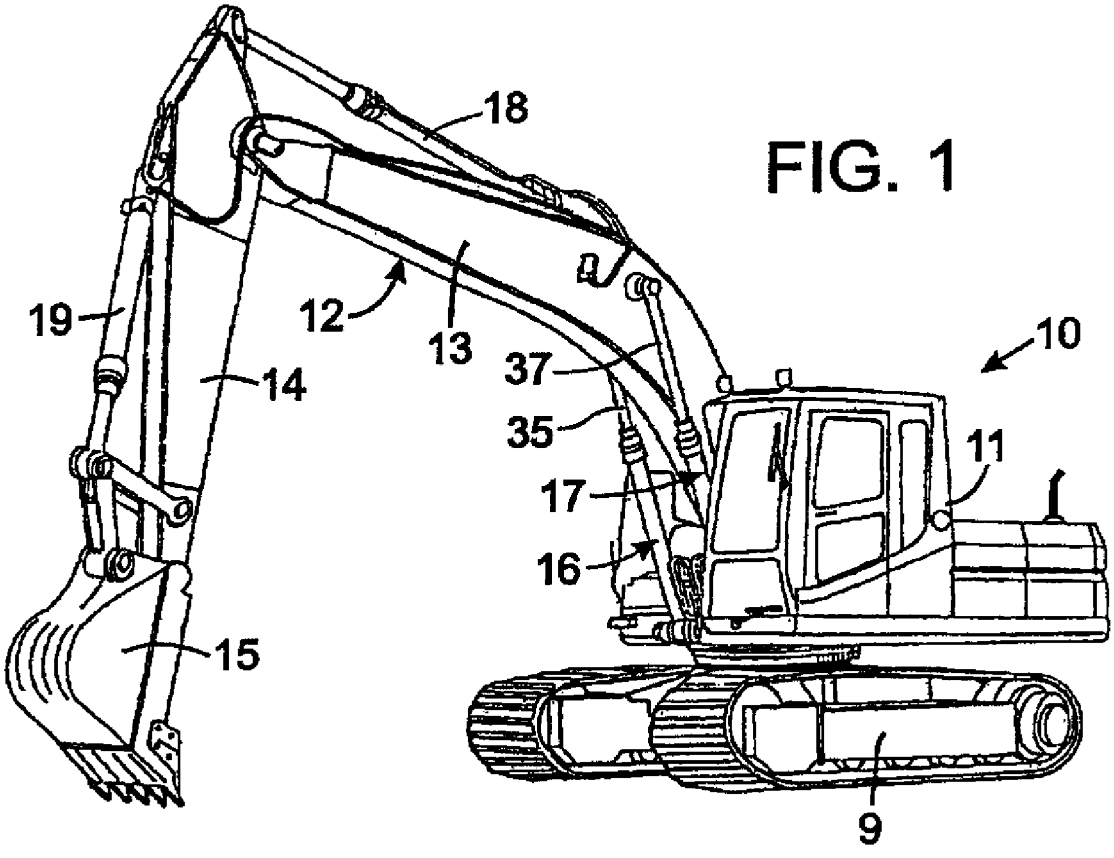
FIG. 1 is an isometric view of an excavator that incorporates a hydraulic system according to the present invention.

With initial reference to FIG. 1, an excavator 10 is composed of a cab 11 that is supported on a crawler, and a boom assembly 12 attached to the cab for up and down motion. The boom assembly 12 is subdivided into a boom 13, an arm 14, and a bucket 15 pivotally attached to each other. The boom 13, that is coupled to the cab 11, is able to pivot up and down when driven by a pair of hydraulic cylinder assemblies 16 and 17 mechanically connected in parallel between the cab and the boom. On a typical excavator the cylinder of these assemblies 16 and 17 is attached to the cab 11 while the piston rod is attached to the boom 13, thus the force of gravity acting on the boom tends to retract the piston rod into the cylinder. Nevertheless, the connection of the cylinder assemblies could be such that gravity tends to extend the piston rod from the cylinder, and many energy recovery techniques to be described also can be used with that configuration. The arm 14, supported at the remote end of the boom 13, is able to swing forward and backward, and the bucket 15 is pivotally coupled at the tip of the arm. Another pair of cylinder assemblies 18 and 19 independently operate the arm 14 and bucket 15. The bucket 15 can be replaced with other work heads.

Figure 2:
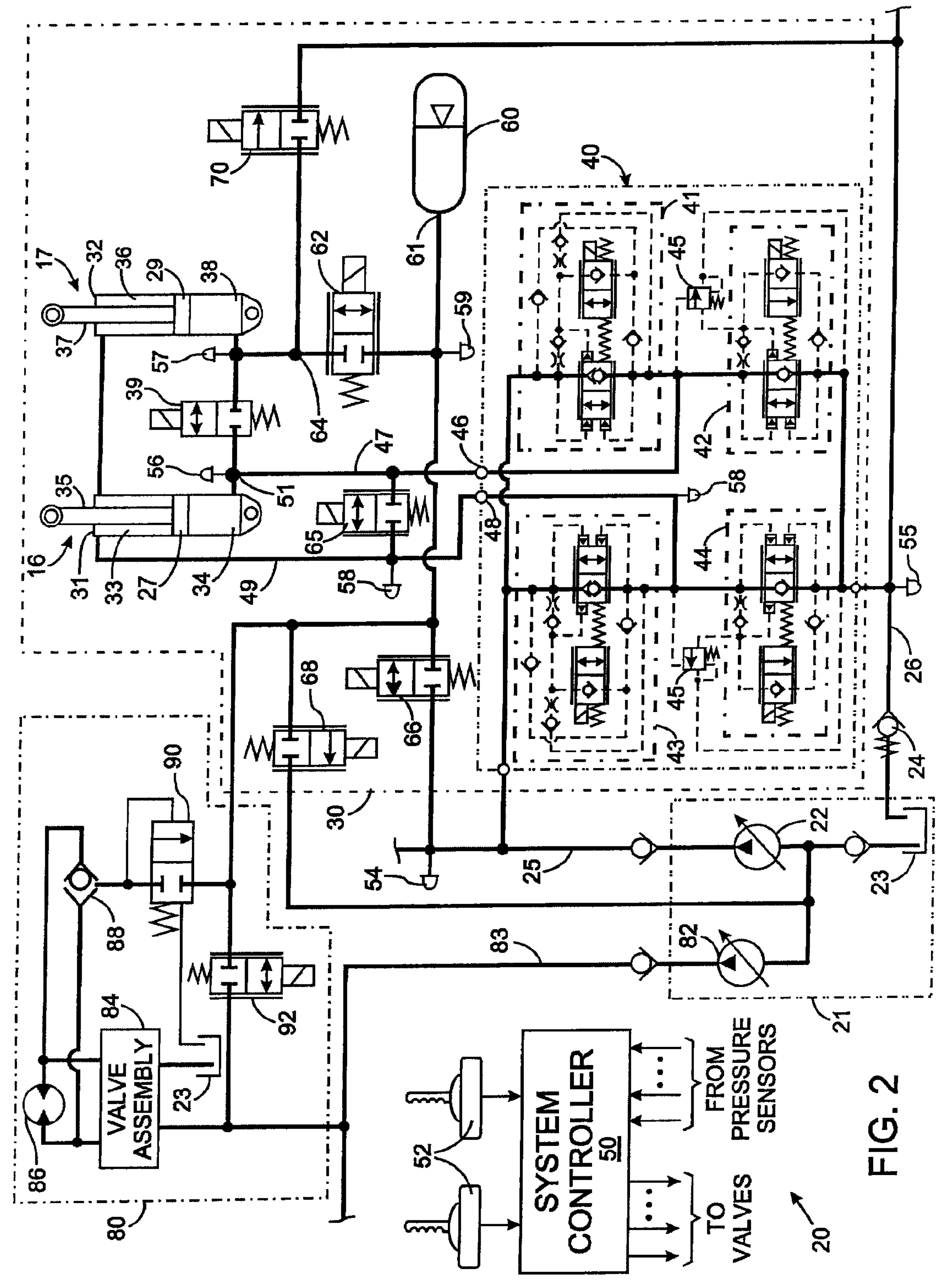
FIG. 2 is a schematic diagram of the portion of the hydraulic system for operating actuators that raise and lower a boom of the excavator.

With reference to FIG. 2, the cylinder assemblies 16, 17, 18 and 19 on the excavator 10 are part of a first hydraulic system 20 that has a source 21 of hydraulic fluid, which comprises a first pump 22 and a tank 23. The first pump 22 draws fluid from the tank 23 and forces the fluid under pressure through a backflow check valve and into a supply conduit 25 that furnishes pressurized fluid to all the hydraulic functions on the excavator. After being used to power a hydraulic function, such as function 30 for raising and lowering the boom 13, the fluid flows back to the tank 23 via a return conduit 26 in which the fluid is pressurized by a spring loaded tank check valve 24. Although the hydraulic system 10 powers several hydraulic functions on the excavator 10, attention is being focused on the boom function 30 to simplify the explanation of the present energy recovery and reuse techniques.

The boom function 30 raises and lowers the boom 13 by controlling the flow of fluid to and from the boom cylinder assemblies 16 and 17, each having a cylinder, a piston with a rod. The first boom cylinder assembly 16 has a first boom cylinder 31 with a first piston 27 slideably received therein which divides the cylinder interior into a rod chamber 33 and a head chamber 34 on opposite sides of the piston. The second boom cylinder assembly 17 has a second boom cylinder 32 with a second piston 29 slideably received therein which divides the cylinder interior into another rod chamber 36 and head chamber 38 on opposite sides of the piston. The volumes of the rod and head chambers change as the associated piston slides within the respective cylinder. In the exemplary excavator 10 of FIG. 1, each boom cylinder 31 or 32 is attached to the cab 11 and each piston 27 or 29 is attached to the boom 13 by a piston rod 35 or 37, respectively.

The rod chambers 33 and 36 are directly connected together hydraulically. A bidirectional, EHP cylinder separation control valve 39 directly couples the head chambers 34 and 38, and preferably is directly connected to each head chamber. Closing the cylinder separation control valve 39 isolates the head chambers from each other and opening the cylinder separation control valve 39 provides a direct path between the two head chambers. A “control valve” is defined herein to mean a valve that is manually operated by a person or electrically operated. The term “directly connected” as used herein means that the associated components are connected together by a conduit without any intervening element, such as a valve, an orifice or other device, which restricts or controls the flow of fluid beyond the inherent restriction of any conduit. As used herein, stating that a hydraulic component “directly couples” two other elements means that the hydraulic component provides a path for fluid to flow between those two other elements without flowing through a control valve assembly or through the supply or return conduits in which fluid flows to and from other hydraulic functions. A statement herein that a control valve provides a “direct path” between two components or elements of the hydraulic system means that path does not contain another control valve.

A control valve assembly 40 couples the boom cylinder assemblies 16 and 17 to the supply and return conduits 25 and 26 and controls the flow of fluid there between. When the control valve assembly 40 supplies pressurized fluid to the head chambers 34 and 38 in the boom cylinders 31 and 32 and drains fluid from the rod chambers 33 and 36, each piston rod 35 and 37 is extended from its cylinder, thereby raising the boom 13. Similarly, supplying pressurized hydraulic fluid from the supply conduit 25 to the rod chambers 33 and 36 and draining fluid from the head chambers 34 and 38, retracts the piston rods 35 and 37 into the boom cylinders 31 and 32, thereby lowering the boom 13. At those times that are commonly referred to as powered extension and powered retraction, the cylinder separation control valve 39 is opened to operate both boom cylinder assemblies 16 and 17 in unison.

The control valve assembly 40 comprises four electrohydraulic proportional (EHP) control valves 41, 42, 43 and 44 that are connected in a Wheatstone bridge arrangement. Alternatively, a solenoid operated spool valve can be used in place of the four EHP control valves 41-44. Preferably, each EHP control valve 41-44 is a pilot-operated, bidirectional control valve, such as the valve described in U.S. Pat. No. 6,745,992 for example, that if necessary incorporates a conventional anti-cavitation valve. The first EHP control valve 41 directs the flow of hydraulic fluid from the supply conduit 25 to a first workport 46, which is connected by a first actuator conduit 47 to a node 51 between the head chamber 34 of the first cylinder 31 and the cylinder separation control valve 39. The head chamber 38 of the second boom cylinder 32 is connected to the first actuator conduit 47, and thus to the head chamber 34 of the first cylinder 31, by the cylinder separation control valve 39, which thereby isolates the first workport 46 from head chamber 38 and the two head chambers from each other. The second EHP control valve 42 governs the flow of fluid between the first workport 46 to the return conduit 26. The third EHP control valve 43 controls a path for fluid to flow between the supply conduit 25 and both cylinder rod chambers 33 and 36 that are connected to a second workport 48 by a second actuator conduit 49. The fourth EHP control valve 44 is connected between the rod chambers 33 and 36 and the return conduit 26.

The four EHP control valves 41-44, as well as the cylinder separation control valve 39, are solenoid operated independently by electrical signals from a system controller 50. By opening both the first and fourth EHP control valves 41 and 44, along with the cylinder separation control valve 39, pressurized fluid is applied to the head chambers 34 and 38 and fluid drains from the rod chambers 33 and 36 to extend the piston rods 35 and 37 and raise the boom 13. Similarly, opening the second and third EHP control valves 42 and 43, as well as the cylinder separation control valve 39, sends pressurized fluid into the rod chambers 33 and 36 and drains fluid from the head chambers 34 and 38 to retract the piston rods 35 and 37, thereby lowering the boom 13.

The system controller 50 is a microcomputer based device that receives control signals from several joysticks 52 by which a human operator designates desired motion of the hydraulic actuators on the excavator. The system controller 50 also receives signals from a supply conduit pressure sensor 54 and a return conduit pressure sensor 55. Separate pressure sensors 56 and 57 are provided for the cylinder head chambers 34 and 38, respectively, while another pressure sensor 58 measures pressure in the rod chambers 33 and 36 of the boom cylinder assemblies 16 and 17. To simplify electrical wiring, the rod chamber pressure sensor 58 preferably is located proximate to the second workport 48, with the understanding that its pressure measurement may be affected by pressure losses in the second actuator conduit 49. The pressure sensors 56, 57 and 58 for the cylinder chambers produce signals indicating the amount of force F acting on the boom 13. The system controller 50 responds to the pressure measurements by operating the variable displacement first pump 22 to regulate pressure in the supply conduit 25 in order to satisfy the pressure demands of the different hydraulic actuators on the excavator.

The first hydraulic system 20 includes several additional valves and other components that form an apparatus which enable energy recovery and reuse for the boom function 30. Specifically, an accumulator 60 is provided to store fluid recovered from the boom cylinder assemblies 16 and 17. An additional pressure sensor 59 is located at the port 61 of the accumulator 60 and produces a signal to the system controller 50 indicating the pressure within the accumulator. The accumulator 60 is coupled to the head chamber 38 of the second boom cylinder assembly 17 by a bidirectional, EHP recovery control valve 62 and is isolated from the head chamber 34 of the first boom cylinder assembly 16. An electrohydraulic accumulator charging and reuse control valve 66 provides a direct path between the supply conduit 25 and the port 61 of the accumulator 60. An electrohydraulic pump return control valve 68 directly connects the port of the accumulator 60 to the inlet of the first pump 22, and a relief control valve 70 directly connects a node 64 at the second cylinder's head chamber 38 to the tank return conduit 26. The node 64 is isolated by the cylinder separation control valve 39 from the head chamber 34 of the first cylinder 31. An EHP workport shunt control valve 65 provides a direct path between the first and second workports 46 and 48, and preferably is directly connected to each workport. All these additional control valves 39, 62, 65, 66, 68 and 70 are operated by signals from the system controller 50.

By selectively operating various combinations of these valves fluid is routed to and from boom cylinder assemblies 16 and 17 and the first pump 22, the tank 23 and the accumulator 60. Fluid exhausting from the boom cylinder assemblies, during gravitational lowering of the boom 13, can be stored under pressure in the accumulator and then subsequently used instead of fluid from the first pump, thereby saving the energy that otherwise would be required to drive that pump. The different modes of energy recovery resulting from operating various combinations of valves will be described later.

The present recovery system also can charge the accumulator 60 with fluid directly from the first pump 22 when none of the hydraulic functions on the machine is being used or when the hydraulic functions that are operating require only a relatively small amount of pump fluid. At those times, the accumulator charging and reuse control valve 66 is opened to connect the supply conduit 25 directly to the port 61 of the accumulator 60. The pressure sensors 54 and 59 indicate when the pressure of the supply conduit is greater than the existing pressure in the accumulator 60 so that charging will occur.

Another mode that reuses the stored energy involves opening the pump return control valve 68, thereby routing stored pressurized fluid from the accumulator 60 to the inlet of the first pump 22. This is particularly useful when the inlet of the pump has a high pressure inlet capability. This energy recovery unloads the torque on the engine which is driving the first pump 22 even though the accumulator pressure is less than the load pressure of the cylinder assemblies 16 and 17 and thus can not be used to power the cylinder assemblies directly. In this case, the first pump only has to use torque from the engine to fulfill the pressure difference between the accumulator 60 and the load pressure on the cylinder assemblies.

With continuing reference to FIG. 2, the first hydraulic system 20 also includes a swing function 80 that bidirectionally rotates the excavator cab 11 and the boom assembly 12 with respect to the crawler 9. A variable displacement second pump 82 furnishes pressurized fluid via a second supply conduit 83 to the swing function 80. A control valve assembly 84, similar to control valve assembly 40, controls the flow of hydraulic fluid from the second pump 82 to a motor 86 and from the motor to the tank 23. The motor 86 has two ports and the valve assembly 84 selectively connects the second pump 82 to one port and connects the other port to the tank, thereby defining the direction that fluid flows through the motor and thus the direction that the cab 11 rotates about the crawler 9.

The two ports of the motor 86 also are connected to the inputs of a shuttle valve 88 that has an outlet coupled by a pressure operated valve 90 to the port 61 of the accumulator 60. The pressure operated valve 90 opens when pressure at the outlet of the shuttle valve 88 exceeds a given level that occurs when the rotation of the cab 11 is coming to a stop. At that time, the pressurized fluid is routed to the accumulator 60 instead of through the valve assembly 84 to the tank 23. Therefore, the energy of the fluid exhausting from the motor 86 at these times is stored in the accumulator 60.

The stored fluid may be used by the boom function 30, as described previously, or may be used to power the swing function motor 86. To accomplish the latter operation, a bidirectional, electrohydraulic supply control valve 92 is opened to convey fluid from the accumulator 60 to the inlet of the valve assembly 84. This accumulator fluid is used in place of or as a supplement to fluid from the second pump 82.

By tying the first and second boom cylinder assemblies 16 and 17 together, the loading on those cylinders is equalized on the production system, but a degree of control freedom is lost. Greater efficiency can be achieved by separating the head chambers 34 and 38 of the two boom cylinder assemblies 16 and 17 to minimize pressure compensation losses on the machine's hydraulic system.

Figure 3:
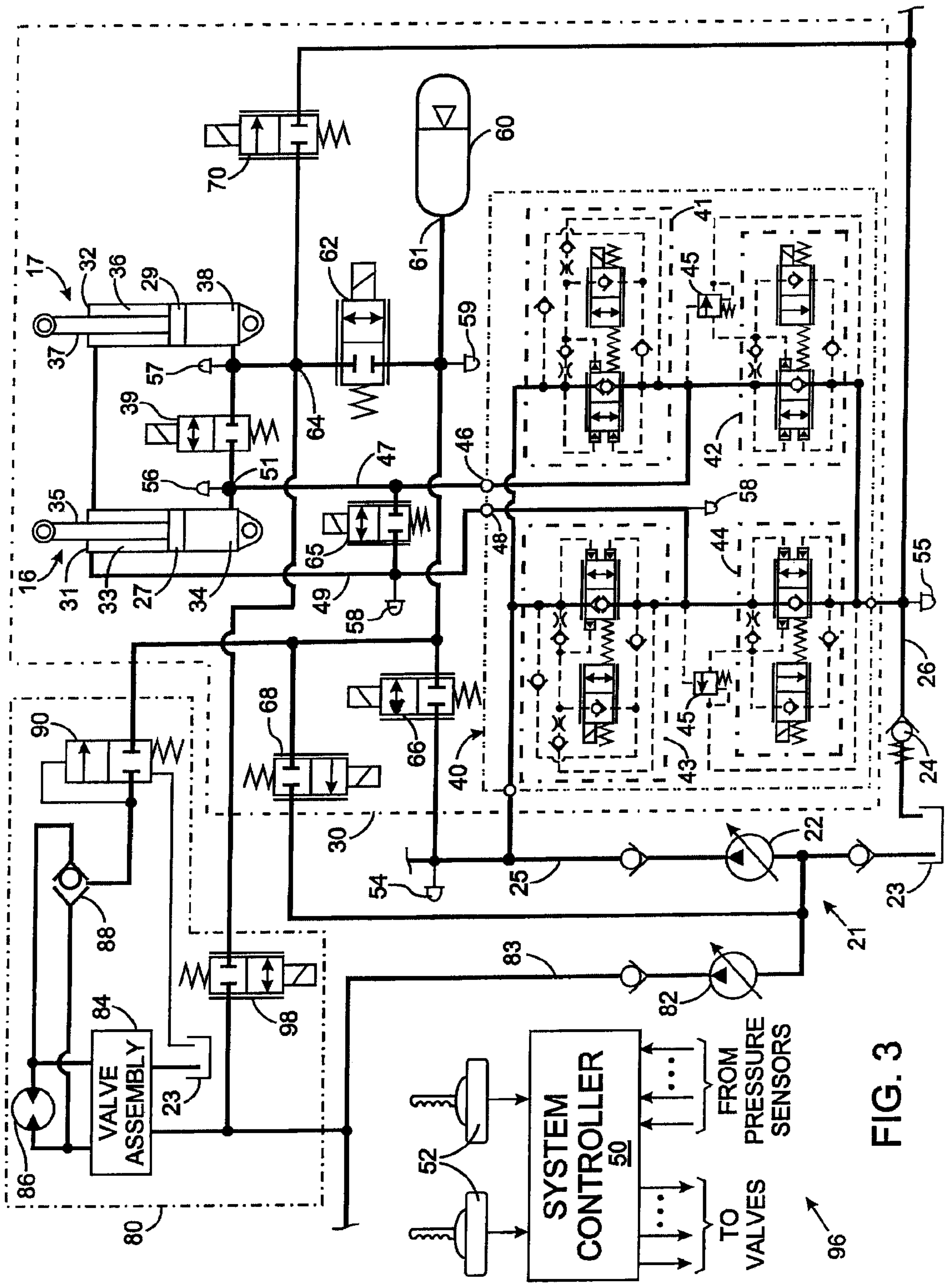
FIG. 3 is a schematic diagram of an alternative portion of the hydraulic system for the boom.

FIG. 3 depicts an alternative second hydraulic system 96 that accomplishes this greater degree of freedom. This second hydraulic system 96 is similar to the first hydraulic system 20 in FIG. 2 and like components have been assigned identical reference numerals. The difference being that the supply control valve 92 in the previously described system 20 has been replaced by bidirectional, electrohydraulic supply control valve 98 that provides a direct path between the second supply conduit 83 from the second pump 82 and the head chamber 38 of the second boom cylinder 32. Preferably the supply control valve 98 is directly connected between the second supply conduit and the head chamber 38. This enables the boom to be raised using the fluid from the first pump 22 to drive the first boom cylinder assembly 16 under the control of the control valve assembly 40, while supply control valve 98 controls application of fluid from the second pump 82 to the second boom cylinder assembly 17.

EXAMPLE 1

Assume that the first pump 22 supplies fluid to other hydraulic functions on the machine and is running at 300 bar pressure to satisfy the highest demand of those functions. In addition, assume that still other hydraulic functions are connected to the second pump 82, which is running at 200 bar pressure to satisfy its highest fluid demand. Further assume that 250 bar pressure is required to lift the load on the boom 13.

With a conventional system, the first pump 22 would stay at 300 bar and the extra 50 bar would be "burned" as pressure compensation losses. In that conventional system, the pressure of the second pump 82 would rise to 250 bar and its other hydraulic functions would produce pressure compensation losses, due to the pressure being greater than required at those functions.

With the system shown in FIG. 3, the first pump 22 continues operating at 300 bar and the second pump 82 continues to operate at 200 bar, thus a combined average of 250 bar. Each of those pumps supplies fluid to the boom cylinder assemblies 16 and 17, the first pump through control valve assembly 40 and the second pump through the supply control valve 98. As a result, each cylinder assembly moves with a different amount of pressure and thus different force. Nevertheless, the resultant net force on the boom 13 is the same as with the conventional system.

EXAMPLE 2

Assume that there is another hydraulic function connected to the first pump 22 that already has consumed all that pump's output flow. If raising the boom 13 is commanded, then the second pump 82 can furnish all the power to the boom through supply control valve 98 and the second cylinder assembly 17, while fluid for the head chamber 34 of first cylinder 31 is drawn from the return conduit 26 through the anti-cavitation check valve in the second EHP control valve 42.

Figure 4:
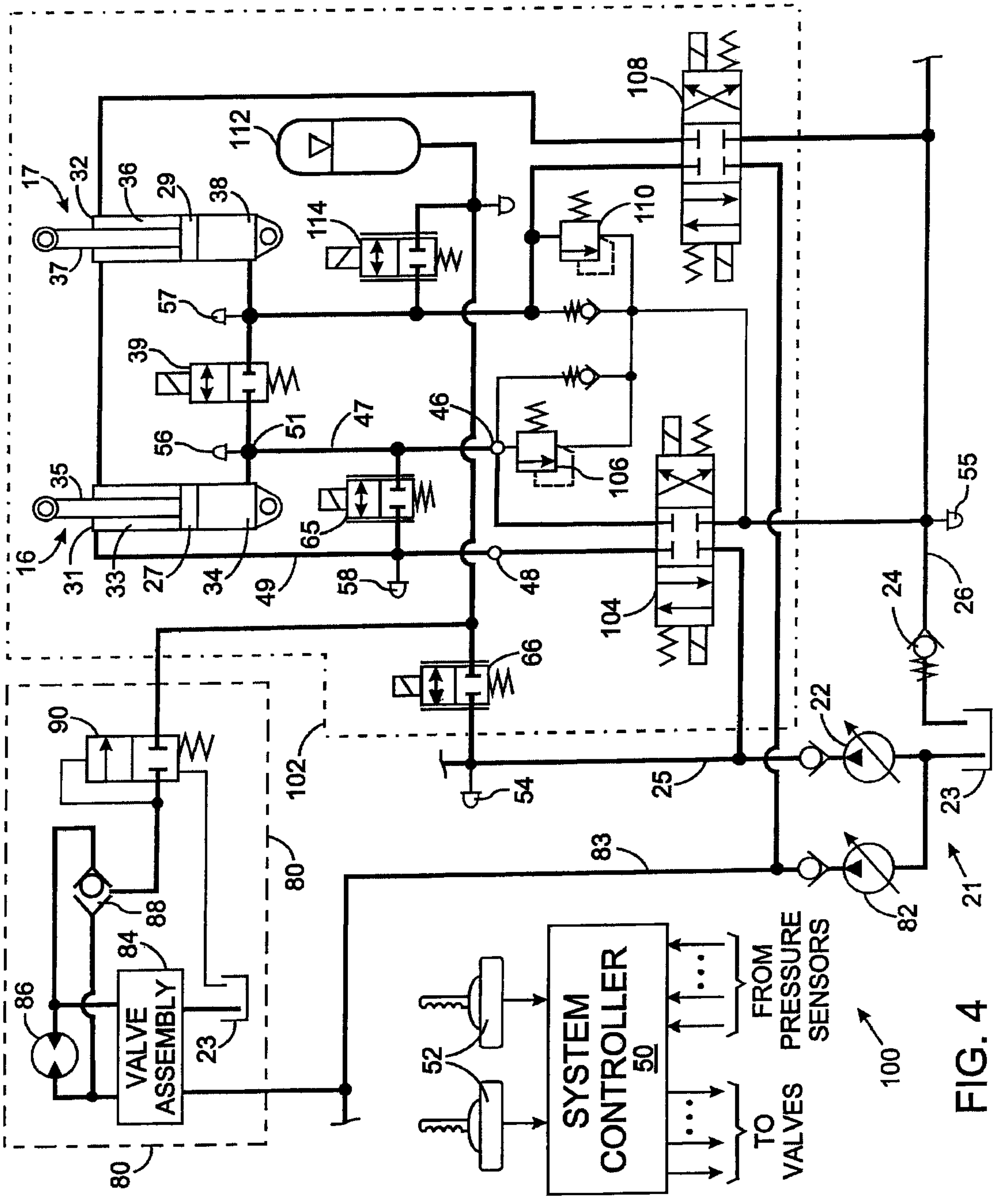
FIG. 4 is a schematic diagram of another alternative portion of the hydraulic system for the boom.
Figure 5:
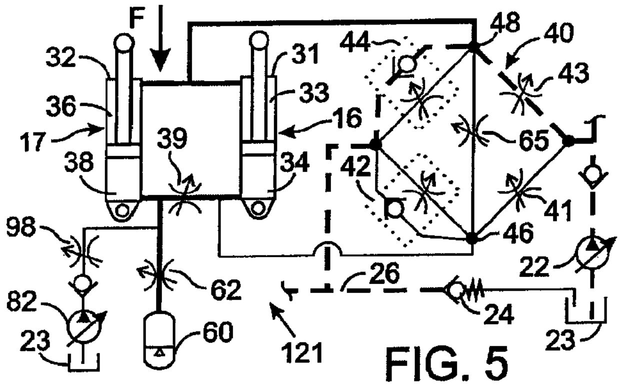
FIGS. 5-9 are abbreviated schematic diagrams of the alternative portion of the hydraulic system in FIG. 3 in different modes of energy recovery.

The functionality of examples 1 and 2 can be provided by a third hydraulic system 100 that uses solenoid operated spool valves, such as depicted in FIG. 4. Hydraulic system 100 includes a boom function 102 in which the same components as in the previously described systems have been identified with identical reference numerals. The head chambers 34 and 38 of the first and second boom cylinders 31 and 32 are coupled hydraulically by a bidirectional, electrohydraulic cylinder separation control valve 39. An electrohydraulic shunt control valve 65 is connected between the ports for the rod and head chambers of the first cylinder 31.

The third hydraulic system 100 has a hydraulic fluid source 21 formed by first and second pumps 22 and 82 which draw fluid from a tank 23 and operates the boom function 102, a swing function 80, and other functions on the machine which are not illustrated. The output of the first pump 22 feeds a first supply conduit 25 that is connected to an inlet of a three-position, four-way, solenoid operated first spool valve 104 that constitutes a control valve assembly of the boom function. An outlet of the first spool valve 104 is connected to the return conduit 26 that leads to the tank 23. The first spool valve 104 has two workports, one 48 connected directly to the rod chambers 33 and 36 of the two hydraulic cylinders and the other workport 46 connected directly to the head chamber 34 of the first hydraulic cylinder 31. A first relief valve 106 is connected between the first workport 46 and the return conduit 26.

The outlet of the second pump 82 feeds a second supply conduit 83 that is connected to the inlet of a three-position, four-way, solenoid operated second spool valve 108 that forms a supply control valve. The outlet of the second spool valve 108 is connected to the return conduit 26. The second spool valve 108 has a pair of workports one of which is connected directly to the rod chambers 33 and 36 of the hydraulic cylinders and the other workport is directly connected to the head chamber 38 of the second hydraulic cylinder 32. A second relief valve 110 is coupled between the head chamber 38 and the return conduit 26. The two spool valves 104 and 108 can be operated independently to apply fluid from each of the two pumps 22 and 82 to the two first and second cylinders 31 and 32 in much the same way as control valves 41-44 and 98 functioned in the second hydraulic system 96 in FIG. 3.

The third hydraulic system 100 also has an accumulator 112 connected by a bi-directional, electrohydraulic valve 114 to the head chamber 38 of the second cylinder 32. This accumulator 112 can be used to store and recycle energy with respect to the first and second hydraulic cylinders 31 and 32 in much the same manner as described with respect to the accumulators in the hydraulic systems in FIGS. 2 and 3.

Energy Recovery

The boom function can be operated in several modes, in some of which energy is recovered from an overrunning load. An overrunning load condition occurs on the exemplary excavator 10 when the load and weight of the boom assembly 12 exerts a force that tends to retract the piston rods 35 and 37 into the boom cylinders 31 and 32, thereby forcing fluid out of the head chambers 34 and 38 without pressurizing the rod chambers 33 and 36. At that time, instead of sending the exhausting fluid to the tank 23, it is directed into the accumulator 60 where the fluid is stored under pressure. The present energy recovery and reuse techniques involve operating the hydraulic circuit in several of the different energy recovery modes as the excavator boom 13 is lowered. Selection of a particular energy recovery mode is based on the pressures within the head and rod chambers of the boom cylinders 31 and 32 and the existing pressure within the accumulator 60. The pressure relationships must be such that the fluid will flow in the proper directions as described for each particular energy recovery mode as described hereinafter. The accumulator pressure is indicated by pressure sensor 59, pressures in the head chambers 34 and 38 are measured by sensors 56 and 57, respectively, and the pressure in both rod chambers 33 and 36 is measured by sensor 58.

Several of the energy recovery modes are depicted in FIGS. 5-9 which are abbreviated schematic diagrams of the second hydraulic system 96 in FIG. 3. In these depictions primary fluid flow paths are indicated by a wide solid line, and partial or optional flow paths, that occur depending on specific operating conditions, are indicated by heavy dashed lines. Thin solid lines indicate paths through which fluid does not flow in the depicted mode. This flow indicating convention also is utilized for energy reuse modes shown in FIGS. 10-15, which will be described subsequently.

Assume that the initial position of the boom assembly 12 is relatively high, thereby having a relatively large amount of potential energy. As a result, the boom exerts a force on each cylinder assembly 16 and 17 that produces sufficient pressure in their head chambers 34 and 38 to charge the accumulator 60 as shown in the dual cylinder energy recovery mode of FIG. 5. Here, the pressure at the accumulator is below the threshold provided by the following inequality:

$$P_{59}<(P_{56}+P_{57})/2-P_{58}/R$$

Here, $P_{59}$ is the pressure at the accumulator from sensor 59, $P_{56}$ is the pressure at the head chamber 34 of the first cylinder assembly 16 from sensor 56; $P_{57}$ is the pressure at the head chamber 38 of the second cylinder assembly 17 from pressure at sensor 57; and $P_{58}$ is the pressure in the rod chambers 33 and 36 of the boom cylinder assemblies 16 and 17, from sensor 58 (See FIG. 3). R is the ratio of areas at the head chambers 34 and 38, and the rod chambers 33 and 36. The cylinder ratio is given by the equation:

$$R=\pi r_A^2/(\pi r_A^2-\pi r_{ROD}^2)$$

Here, $r_A$ is the radius of the head chambers 34 and 38, and $r_{ROD}$ is the radius of the piston rods 35 and 37. R is a constant for the selected cylinder assemblies 16 and 17 chosen for the hydraulic circuit. The term $(P_{56}+P_{57})/2-P_{58}/R$ is referred to as the dual cylinder energy recovery mode differential pressure herein. In addition, it should be noted that the above inequality may be modified to include losses due to friction and other factors.

Figure 6:
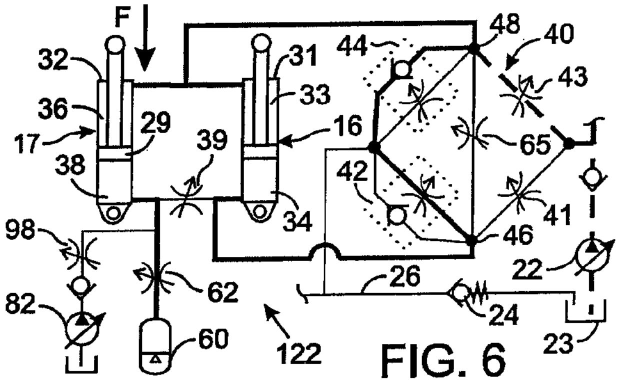
Figure 7:
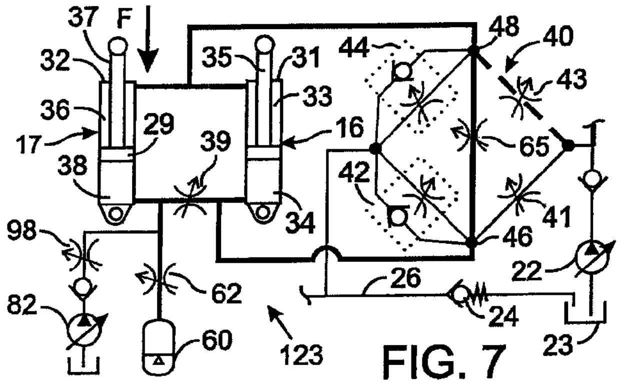

In the dual cylinder energy recovery mode 121, the fluid exhausting from the head chambers 34 and 38 is combined by an open cylinder separation control valve 39 and flows through an open recovery control valve 62 to charge the accumulator 60. The recovery control valve 62 is modulated to proportionally control the velocity of the boom. Fluid required to fill the expanding rod chambers 33 and 36 as the boom descends is drawn through the control valve assembly 40. Specifically, fluid from other functions of the machine is drawn from the return conduit 26 through the anti-cavitation check valve in the fourth EHP control valve 44. Because the force of gravity is lowering the boom, the fluid drawn from the return conduit 26 does not have to be at a high pressure. If this anti-cavitation flow is insufficient, the third EHP control valve 43 can be opened to furnish fluid from the first pump 22 to the rod chambers 33 and 36. The descent of the boom 13 reaches a position at which the force exerted on the two cylinder assemblies 16 and 17 no longer produces sufficient pressure in both head chambers to continue charging the accumulator 60. When the pressure at the accumulator is below the threshold provided by the following inequality:

$$P_{59}<((P_{56}+P_{57})/2-P_{58}/R)*2$$

the energy recovery transitions into a split cylinder energy recovery mode 122 depicted in FIG. 6, that intensifies the pressure in one cylinder head chamber to charge the accumulator. The right side of this inequality is referred to as the split cylinder energy recovery mode differential pressure herein. It should be noted that the above inequality may be modified to include losses due to friction and other factors. While the recovery control valve 62 remains open to continue charging the accumulator 60, the second EHP control valve 42 is gradually opened as the cylinder separation control valve 39 is closed. This sends pressurized fluid from the head chamber 34 of the first boom cylinder 31 through second EHP control valve 42 and the anti-cavitation valve in the fourth EHP control valve 44 to the rod chambers 33 and 36 of both boom cylinders. Closing the cylinder separation control valve 39, isolates the two boom cylinders 31 and 32 from each other and shifts the two head chambers 34 and 38 from an initial equal pressure condition to states in which those chambers have different pressures and thus exert different forces. In the split cylinder energy recovery mode 122 the force from the boom is supported by only the second cylinder assembly 17 and thus the pressure in the head chamber 38 of the second cylinder 32 has higher pressure for charging the accumulator than when the boom force was supported by both cylinder assemblies 16 and 17 as in the dual cylinder energy recovery mode 121 shown in FIG. 5.

The head chamber 38 of the second cylinder 32 produces a sufficiently high pressure therein to continue charging the accumulator 60. Thus fluid from that head chamber 38 is directed through the recovery control valve 62 into the accumulator 60. During this split cylinder energy recovery mode 122, the recovery control valve 62 and the second EHP control valve 42 are modulated to control the rate at which the boom 13 continues to lower.

In the split cylinder energy recovery mode 122, if the amount of the head chamber fluid is inadequate to fill both rod chambers 33 and 36, the third EHP control valve 43 can be opened to furnish supplemental fluid from the first pump 22. That supplemental fluid does not have to be at a particular pressure as it is not used to drive the cylinder assemblies 16 and 17, but only to fill the expanding rod chambers. On the other hand, if the head chamber 34 of the first cylinder 31 contains more fluid than is needed to fill both rod chambers 33 and 36, as occurs with a very large diameter piston rods, the excess fluid can be sent to the return conduit 26 by selectively opening the second EHP control valve 42.

Because the flow of fluid from each head chamber 34 and 38 is controlled separately in the split cylinder energy recovery mode 122, the forces on each side of the boom 13 may be unequal producing a twisting action thereon. To avoid that condition, a pseudo-split cylinder energy recovery mode 123 shown in FIG. 7 can be employed. This mode can be entered directly from the dual cylinder energy recovery mode (FIG. 5) when the pressure on the accumulator falls below the threshold provided by the following equation:

$$P_{59}<(R/R-1)*((P_{56}+P_{57})/2-P_{58}/R)$$

The right side of this inequality is referred to as the pseudo-split cylinder energy recovery mode differential pressure herein. It should be noted that the above inequality may be modified to include losses due to line losses, friction and other factors.

In this mode, the cylinder separation control valve 39 remains open to communicate pressure between the two head chambers 34 and 38. The EHP workport shunt control valve 65 opens to convey pressurized fluid from the head chamber 34 of the first boom cylinder 31 to both rod chambers 33 and 36.

On a typical excavator, the boom cylinder assemblies 16 and 17 have large diameter piston rods 35 and 37, so that as the piston moves the volume of each rod chamber 33 and 36 may change half the amount that the volume of each head chamber changes, for example. This means that in the pseudo-split cylinder energy recovery mode 123, the fluid exhausting the first cylinder's head chamber 34 is sufficient to fill both of the expanding rod chambers 33 and 36. Therefore, fluid does not flow through the open cylinder separation control valve 39, however if that one to two volume relationship does not exist, any additional fluid needed to fill the rod chambers 33 and 36 can come through the cylinder separation control valve from the second cylinder's head chamber 38. Nevertheless, most, if not all, of the fluid in head chamber 38 of the second cylinder 32 flows into the accumulator 60.

Figure 8:
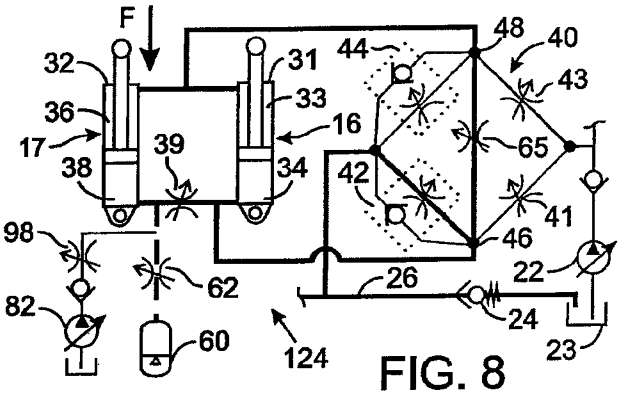
Figure 9:
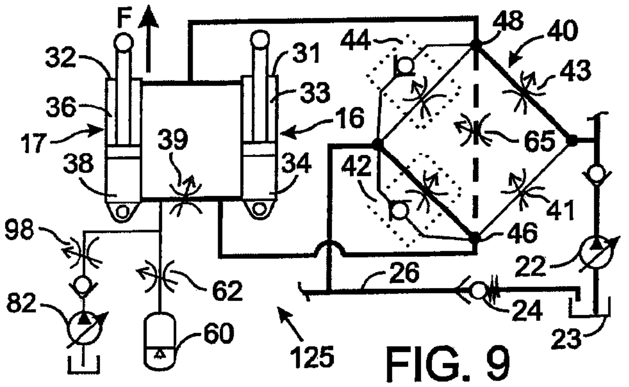
Figure 10:
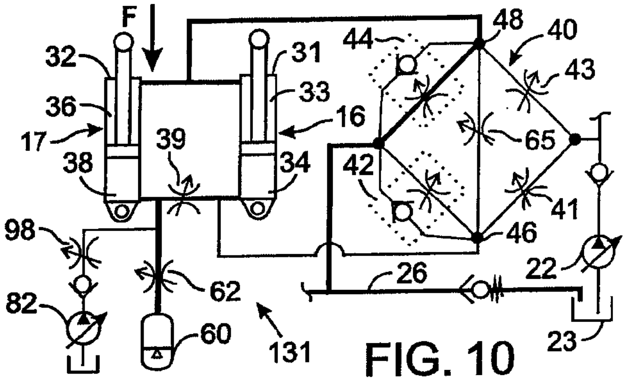
FIGS. 10-15 are abbreviated schematic diagrams of the alternative portion of the hydraulic system in FIG. 3 in various modes of reusing the recovered energy.

When operation in a split cylinder energy recovery mode 122 or 123 reaches a point at which there no longer is sufficient pressure available from the head chamber 38 of the second cylinder 32 to charge the accumulator, but is greater than zero, as given by the following equation:

$$(P_{56}+P_{57})/2-P_{58}/R>0$$

the boom operation transitions into a cross chamber energy recovery mode 124 depicted in FIG. 8. The left side of this inequality is referred to as the cross chamber energy recovery mode differential pressure herein. It should be noted that the above inequality may be modified to include losses due to friction and other factors. In the cross chamber energy recovery mode 124 the recovery control valve 62 typically closes to preserve a relatively high pressure charge in the accumulator 60. Nevertheless, there may be enough residual pressure in the head chamber 38 of the second boom cylinder 32 to continue charging the accumulator as indicted by pressure sensors 57 and 59 (FIG. 3) and thus the recovery control valve 62 may be partially open in this mode. In either case, the cylinder separation control valve 39 opens along with the workport shunt control valve 65 so that some fluid from both head chambers 34 and 38 is conveyed into to fill the expanding rod chambers 33 and 36. Because the aggregate amount of fluid exhausting from the head chambers is more than is needed to fill the rod chambers, the second EHP control valve 42 opens so to convey that excess fluid into the return conduit 26 and onward to the tank 23.

It should be noted that the energy recovery modes 121, 122, 123, and 124 do not need to follow the sequence as described above. The selection of one of the energy recovery modes 121, 122, 123, and 124 should be based on the recovery efficiency benefits that each mode would provide at a given time. Accordingly, any energy recovery mode may transition to any of the other energy recovery modes, and an appropriate selection can be made by the system controller 50 based on the equations provided herein.

In the cross chamber energy recovery mode 124, the accumulator reaches peak storage capability. In addition, as the cylinder separation control valve 39 opens, pressure in the two cylinder head chambers 34 and 38 begins to equalize again. Although the preferred embodiment incorporates the workport shunt control valve 65, that valve could be eliminated as a cost saving measure if the split cylinder energy recovery mode 123 is not used. In that case, at the times when the workport shunt control valve would be opened, the control valve assembly 40 is operated by opening the second and fourth EHP control valves 42 and 44 to convey fluid through one of those pairs between the two workports 46 and 48 along with opening the isolation valve 39.

Eventually the boom 13 reaches such a low position that the forces due to gravity alone are insufficient to continue lowering the boom fast enough for efficient operation of the excavator. Pressure from a pump now is needed to further lower the boom. At this juncture, the operation transitions to a powered energy mode 125 shown in FIG. 9. Now the third EHP control valve 43 opens to apply pressurized fluid from the first pump 22 to the rod chambers 33 and 36 of both boom cylinders 31 and 32. This pressurized fluid propels the pistons to further retract the piston rods thereby driving the boom 13 downward. The fluid exhausting from the head chambers 34 and 38 at this time is conveyed by the opened cylinder separation control valve 39 and the second EHP control valve 42 into the return conduit 26. The second and third EHP control valves 42 and 43 are modulated to control the velocity of the boom.

The positions of the boom 13 and arm 14 of the excavator 10 affect the amount of force that the boom exerts on the cylinder assemblies 16 and 17 and thus the amount of energy that can be recovered. The amount of force corresponds to the cylinder chamber pressures as measured by the sensors 56, 57 and 58. Therefore, the signals from those sensors along with the accumulator pressure sensor 59 enable the system controller 50 to determine which of the energy recovery modes are practical and which one will recover the most energy.

Energy Reuse

When it comes time to extend the piston rods from the boom cylinders 31 and 32 and raise the boom 13 against a load force F acting downward, fluid can be recycled from the accumulator 60 in place of or in addition to using pressurized fluid from the first pump 22. In a first energy reuse mode 131 shown in FIG. 10, fluid stored in the accumulator 60 is fed via open recovery control valve 62 and cylinder separation control valve 39 to both cylinder head chambers 34 and 38. Fluid that is exhausting from the rod chambers 33 and 36 flows via an opened fourth EHP control valve 44 into the return conduit 26.

Figure 11:
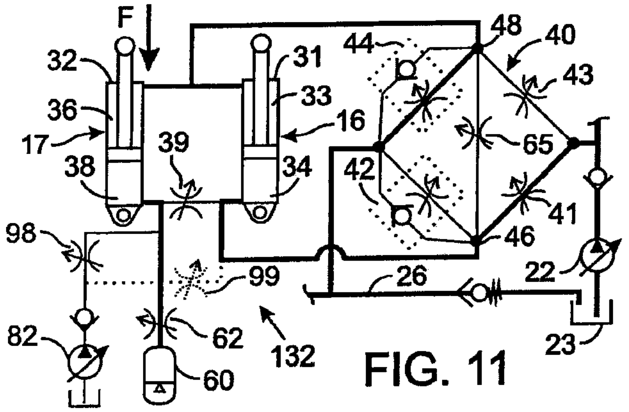
Figure 12:
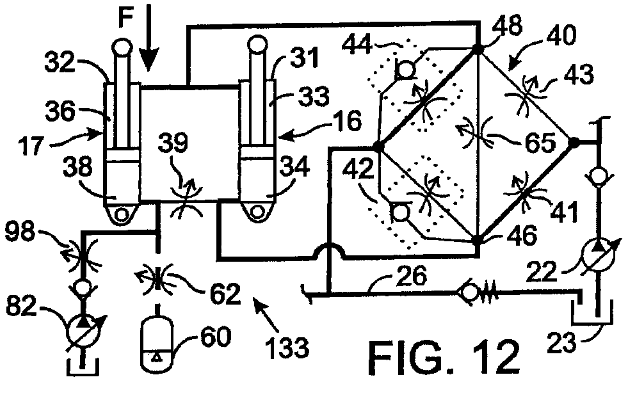

It should be understood that often the accumulator 60 is not charged to a pressure level that is sufficient to drive both cylinder assemblies 16 and 17. In addition, the quantity of fluid stored in the accumulator also may not be sufficient to fill both head chambers 34 and 38. In such instances, a second energy reuse mode 132 depicted in FIG. 11 is implemented in which the recovery control valve 62 is opened while the cylinder separation control valve 39 is closed. This directs fluid from the accumulator 60 into only the head chamber 38 of the second cylinder 32. The recovery control valve 62 typically is fully open to eliminate metering losses on the flow from the accumulator. The head chamber 34 of the first cylinder 31 receives pressurized fluid from the first pump 22 via the first EHP control valve 41. Thus, the first cylinder 31 is driven by pump fluid and the second cylinder 32 by fluid from the accumulator. The first EHP control valve 41 and the recovery control valve 62 are modulated to control the rate at which the boom raises. While this is occurring, fluid exiting the two rod chambers 33 and 36 flows through an opened fourth EHP control valve 44 into the return conduit 26.

The second pump 82 may be connected by a second supply valve 99 to the port of the head chamber 34 for the first boom cylinder 31, in which case pressurized fluid from the second pump can be supplied to that head chamber to augment fluid from the first pump 22. To accomplish this, the second supply valve 99 meters fluid to the head chamber 34 for the first boom cylinder 31, while the first EHP control valve 41 is used to meter fluid flow.

Eventually, fluid from the accumulator 60 is depleted and can no longer be utilized to drive the second cylinder 32. At that time, the hydraulic system operation may enter a third energy reuse mode 133 illustrated in FIG. 12 in which fluid from the second pump 82 is used instead of or as a supplement to fluid from the accumulator 60. This is accomplished by opening the supply control valve 98 to direct fluid from the second pump 82 to the head chamber 38 of the second cylinder 32. The head chamber 34 of the first cylinder 31 continues to receive fluid from the first pump 22 via the control valve assembly 40 and fluid exhausting from the rod chambers 33 and 36 also is fed through the control valve assembly to the return conduit 26. In third energy reuse mode 133, the first EHP control valve 41 and the supply control valve 98 are modulated to control the rate at which the boom 13 raises.

Figure 13:
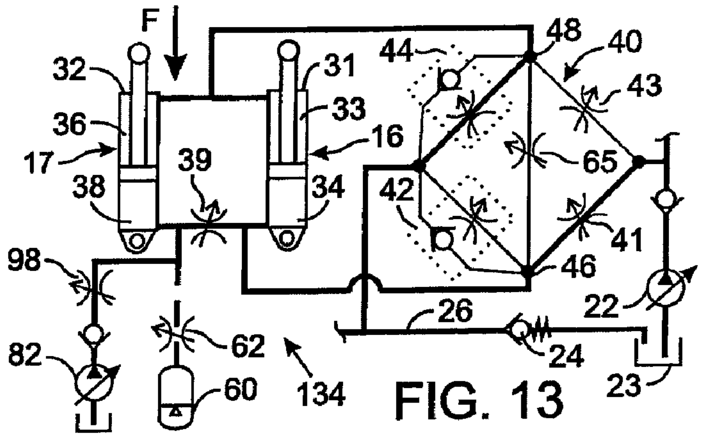

FIG. 13 shows a fourth energy reuse mode 134 in which the outputs of the first and second pumps 22 and 82 are combined by the cylinder separation control valve 39 and applied to both head chambers 34 and 38. In the fourth energy reuse mode 134, fluid from the first pump 22 is conveyed by the first EHP control valve 41 to head chambers 34 and 38, while the supply control valve 98 conveys fluid from the second pump 82 to those same chambers. Some fluid may flow from the accumulator 60 depending upon the pressure level therein. Fluid that is exhausting from the rod chambers 33 and 36 flows via an opened fourth EHP control valve 44 into the return conduit 26.

Figure 14:
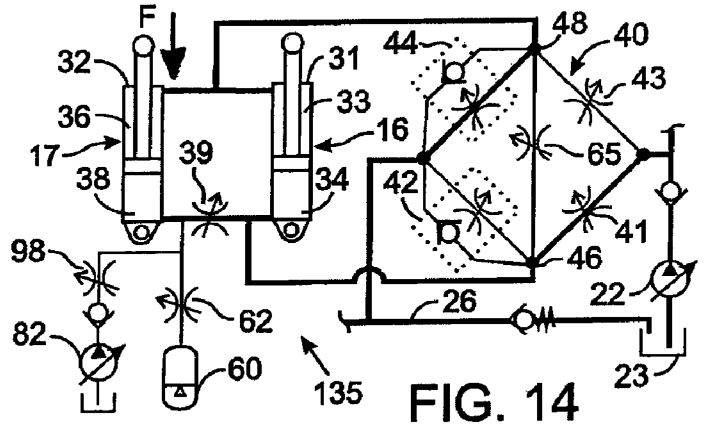

FIG. 14 illustrates a fifth energy reuse mode 135 in which fluid from only the first pump 22 powers the head chambers 34 and 38 of both hydraulic cylinder assemblies 16 and 17. The second pump 82 does not supply the boom function 30 in this mode. Now the first EHP control valve 41 controls the flow of fluid from the first pump 22 to the head chambers 34 and 38 and the rate at which the boom is raised. The fourth EHP control valve 44 controls the fluid flow from the rod chambers 33 and 36 to the return conduit 26.

In the first through fifth energy reuse modes 131-135 the force acting on the boom 13 tended to lower the boom. In other operational states of the excavator 10, an external force tends to raise the boom 13. For example with reference to FIG. 1, assume that the boom assembly 12 is fully extended for its farthest reach from the excavator cab 11 and then the arm cylinder assembly 18 is powered to draw the bucket toward the cab to dig into the ground. Resistance to this digging action exerts an upward force which tends to raise the boom without applying pressurized fluid from either pump 22 or 82 to the boom cylinder assemblies 16 and 17.

Figure 15:
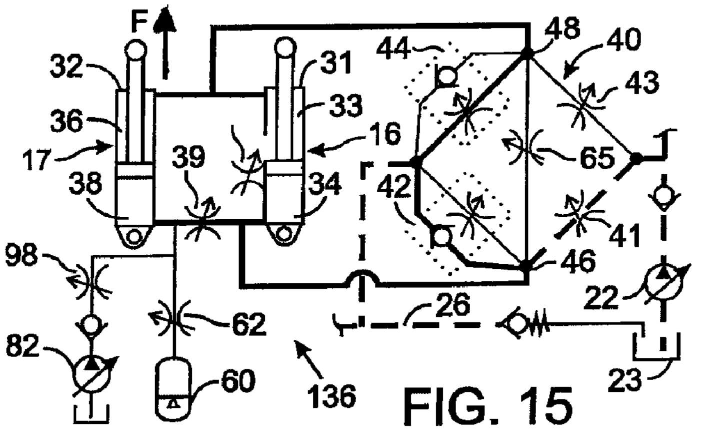

While this upward force is being exerted on the boom 13, the portion of the hydraulic system for the boom cylinder assemblies 16 and 17 can be configured as depicted in FIG. 15. In this sixth reuse mode 136, the forces acting on the boom 13 further extend the piston rods from the cylinders 31 and 32 which forces fluid from the rod chambers 33 and 36 to the second workport 48 of the control valve assembly 40. The fourth EHP control valve 44 now is opened to a degree that controls the boom to a desired velocity and conveys the exhausting fluid into the return conduit 26. However, the expanding head chambers 34 and 38 produce a low pressure at the first workport 46 which causes the anti-cavitation valve within the second EHP control valve 42 to open conveying the pressurized fluid from the return node to the first workport 46. That fluid continues to flow from the first workport 46 to both head chambers 34 and 38 via a now opened cylinder separation control valve 39. Because the combined volume of the head chambers 34 and 38 is greater than the combined volume of the two rod chambers 33 and 36 additional fluid is required to fill the head chambers. That additional fluid is drawn into the control valve assembly 40 either from the return conduit 26 or if sufficient pressure does not exist in that conduit as indicated by pressure sensor 55, the first EHP control valve 41 is opened to furnish fluid from the first pump 22. The fluid from the first pump does not have to be supplied at a particular pressure as it is not driving the cylinders, but merely filling the expanding chambers.

Although the hydraulic system is described above as including a cylinder separation control valve 39, advantages of the invention related to recovery and reuse of energy in the accumulator as discussed above can also be achieved without this valve. Here, the head chamber 34 of the first cylinder assembly 16 and head chamber 38 of the second cylinder assembly 17 are tied together in fluid communication, rather than coupled to the cylinder separation control valve 39. During a recovery operation, in which excess pressure is provided to the accumulator, a circuit constructed in this way would operate as described above with respect to FIGS. 5, 7, 8 and 9, moving through the modes of FIGS. 5, 7, 8, and 9 as described above. During reuse, referring to FIGS. 2 and 3, fluid flows from the accumulator 60 through port 61 to charging and reuse control valve 66 which is opened to supply conduit 25. The first pump 22 may also provide additional fluid to the supply conduit 25 in this reuse mode. Although two cylinders 16 and 17 are shown, when the cylinder separation valve 39 is removed, a single cylinder can be used. Irrespective of whether one or two cylinders is used, a single pressure sensor 56 or 57 can be used.

The foregoing description was primarily directed to preferred embodiments of the present invention. Although some attention was given to various alternatives within the scope of the invention, it is anticipated that one skilled in the art will likely realize additional alternatives that are now apparent from disclosure of embodiments of the invention.

What is claimed is:

1. A hydraulic system for a machine and having an energy recovery apparatus, said hydraulic system comprising:

a supply conduit conveying pressurized fluid;

a return conduit conveying fluid to a tank;

first and second cylinders mechanically connected in parallel to operate a component of the machine and each having a first chamber and a second chamber;

a cylinder separation control valve in fluid communication with and controlling fluid flow between the first chamber of the first cylinder and the first chamber of the second cylinder, wherein a node is formed between the first chamber of the first cylinder and cylinder separation control valve;

a control valve assembly having a first workport and a second workport, the first workport being connected to the node, the second workport is connected to the second chambers of both the first and second cylinders, and wherein operation of the control valve assembly connects each of first and second workports selectively to the supply conduit and the return conduit;

an accumulator; and a recovery control valve directly connected to both the accumulator and the first chamber of the second cylinder.

2. The hydraulic system of claim 1, wherein the recovery control valve further controls fluid flow from the accumulator to the first chamber of the second cylinder.

3. The hydraulic system of claim 1, further comprising a charging and reuse control valve in fluid communication with the accumulator to control fluid flow from the accumulator to the supply conduit.

4. The hydraulic system as recited in claim 1 wherein the cylinder separation control valve is directly connected between the first chamber of the first cylinder and the first chamber of the second cylinder.

5. The hydraulic system as recited in claim 1 further comprising a workport shunt control valve controlling fluid flow between the first and second workports.

6. The hydraulic system as recited in claim 5 wherein the workport shunt control valve is directly connected between the first and second workports.

7. The hydraulic system as recited in claim 1 wherein the hydraulic system includes a first pump having an outlet connected to the supply conduit and having an inlet; and further comprising a pump return control valve controlling fluid flow from the accumulator to the inlet of the pump.

8. The hydraulic system as recited in claim 1 wherein the hydraulic system includes a first pump having a first outlet connected to the supply conduit; and a second pump having a second outlet; and further comprising a supply control valve in fluid communication with and controlling fluid flow from second outlet to the first chamber of the second cylinder.

9. The hydraulic system as recited in claim 1 further comprising a first sensor operably connected to measure pressure in the first chamber of the first cylinder; a second sensor operably connected to measure pressure in the first chamber of the second cylinder; and a third sensor operably connected to measure pressure in the accumulator.

10. The hydraulic system as recited in claim 9 further comprising a fourth sensor operably connected to measure pressure in the second chambers of the first and second cylinders.

11. The hydraulic system as recited in claim 1 further comprising an accumulator charging and reuse control valve in fluid communication with and controlling fluid flow between the first pump and the accumulator.

12. The hydraulic system as recited in claim 1 wherein the control valve assembly comprises a first control valve coupling the first workport to the supply conduit, and a second control valve coupling the second workport to the supply conduit, a third control valve coupling the first workport to the return conduit connected to a tank, and a fourth control valve coupling the second workport to the return conduit.

13. The hydraulic system as recited in claim 12 wherein the first, second, third, and fourth control valves are electrohydraulic proportional valves.

14. In a hydraulic system that has a first cylinder assembly and a second cylinder assembly mechanically connected in parallel to operate a component and each having first and second chambers, and a control valve assembly which selectively connects each of first and second workports to a supply conduit and a return conduit, wherein the first workport is connected to the first chamber of the first cylinder assembly and is isolated from the first chamber of the second cylinder, and the second workport is connected to the second chambers of both the first and second hydraulic cylinder assemblies, an energy recovery apparatus comprising:

a cylinder separation control valve in fluid communication with and controlling fluid flow between the first chamber of the first cylinder assembly and the first chamber of the second cylinder assembly;

a workport shunt control valve in fluid communication with both the first and second workports to control fluid flow there between;

an accumulator; and a recovery control valve controlling fluid flow to the accumulator from the first chamber of the second cylinder without the fluid flow entering either the supply conduit or the return conduit.

15. The energy recovery apparatus of claim 14, wherein the recovery control valve further controls fluid flow from the accumulator to the first chamber of the second cylinder.

16. The energy recovery apparatus of claim 14, further comprising a charging and reuse control valve in fluid communication with the accumulator to control fluid flow from the accumulator to the supply conduit.

17. The energy recovery apparatus as recited in claim 14 further comprising a system controller operating the energy recovery apparatus in an energy recovery mode in which the cylinder separation control valve is closed, fluid is routed through the control valve assembly between the first and second chambers of the first cylinder assembly and other fluid is routed from the first chamber of the second cylinder assembly to the accumulator.

18. The energy recovery apparatus as recited in claim 14 further comprising a system controller operating the energy recovery apparatus in an energy recovery mode in which the cylinder separation control valve, the recovery control valve and the workport shunt control valve are opened, thereby routing fluid through the workport shunt control valve between the first and second chambers of the first cylinder assembly, and routing fluid from the first chamber of the second cylinder assembly to the accumulator.

19. The energy recovery apparatus as recited in claim 14 further comprising a system controller operating the energy recovery apparatus in a first energy recovery mode in which fluid is routed through the cylinder separation control valve and the recovery control valve into the accumulator, and a second energy recovery mode in which the cylinder separation control valve, the recovery control valve and the workport shunt control valve are opened, thereby routing fluid through the workport shunt control valve between the first and second chambers of the first cylinder assembly, and routing fluid from the first chamber of the second cylinder assembly to the accumulator.

20. The energy recovery apparatus as recited in claim 14 further comprising a system controller operating the hydraulic system in an energy reuse mode in which the cylinder separation control valve is closed while fluid is routed from the accumulator through the recovery control valve to the first chamber of the second cylinder assembly, and other fluid is routed from the supply conduit to the first chamber of the first cylinder assembly.

21. The energy recovery apparatus as recited in claim 14 wherein the hydraulic system includes a pump having an outlet connected to the supply conduit and having an inlet; and further comprising a pump return control valve controlling fluid flow from the accumulator to the inlet of the pump.

22. The energy recovery apparatus as recited in claim 21 further comprising a system controller operating the hydraulic system in a mode in which fluid is routed through the pump return control valve from the accumulator to an inlet of the pump, and fluid is routed from the supply conduit to the first and second cylinder assemblies.

23. The energy recovery apparatus as recited in claim 14 further comprising a system controller operating the energy recovery apparatus in a cross chamber recovery mode in which the cylinder separation control valve is opened, fluid is routed from the first chambers of both the first and second hydraulic cylinders into the second chambers of both the first and second hydraulic cylinders, and the recovery control valve is opened to route excess fluid to one of the accumulator and the return conduit.

24. A hydraulic system for a machine and having an energy recovery apparatus, said hydraulic system comprising:

a supply conduit conveying pressurized fluid;

a first pump having a first outlet connected to the supply conduit and having an inlet;

a return conduit conveying fluid to a tank;

a hydraulic cylinder to operate a component of the machine and having a first chamber and a second chamber;

a control valve assembly having a first workport and a second workport, wherein the first workport is in fluid communication with the first chamber of the hydraulic cylinder and the second workport is in fluid communication with the second chamber of the hydraulic cylinder, and wherein operation of the control valve assembly connects each of first and second workports selectively to the supply conduit and the return conduit;

a workport shunt control valve having a state that provides a direct path between the first workport and the second workport to control fluid flow there between;

an accumulator;

a pump return control valve directly connected to both the accumulator and the inlet of the pump for selectively enabling fluid to flow from the accumulator to the inlet of the pump; and a recovery control valve controlling fluid flow to the accumulator from the first chamber of the hydraulic cylinder without the fluid flow entering either the supply conduit or the return conduit.

25. The hydraulic system of claim 24, wherein the recovery control valve further controls fluid flow from the accumulator to the first chamber of the hydraulic cylinder.

26. The hydraulic system as recited in claim 24 further comprising a second hydraulic cylinder having a first chamber and a second chamber, and a cylinder separation control valve connected between the first chamber of the first cylinder and the first chamber of the second cylinder.

27. The hydraulic system as recited in claim 24 wherein the hydraulic system includes a second pump having a second outlet; and further comprising a supply control valve in fluid communication with and controlling fluid flow from the second outlet to the first chamber of the hydraulic cylinder.

28. The hydraulic system as recited in claim 24 further comprising a first sensor operably connected to measure pressure in the first chamber of the hydraulic cylinder, and a second sensor operably connected to measure pressure in the accumulator.

29. The hydraulic system as recited in claim 28 further comprising a third sensor operably connected to measure pressure in the second chamber of the hydraulic cylinder.

30. The hydraulic system as recited in claim 24 further comprising an accumulator charging and reuse control valve in fluid communication with and controlling fluid flow between the supply conduit and the accumulator.

31. The hydraulic system as recited in claim 24 wherein the control valve assembly comprises a first control valve coupling the first workport to the supply conduit, and a second control valve coupling the second workport to the supply conduit, a third control valve coupling the first workport to the return conduit, and a fourth control valve coupling the second workport to the return conduit.

32. The hydraulic system as recited in claim 31 wherein the first, second, third, and fourth control valves are electrohydraulic proportional valves.

* * * * *